United States Patent Office.

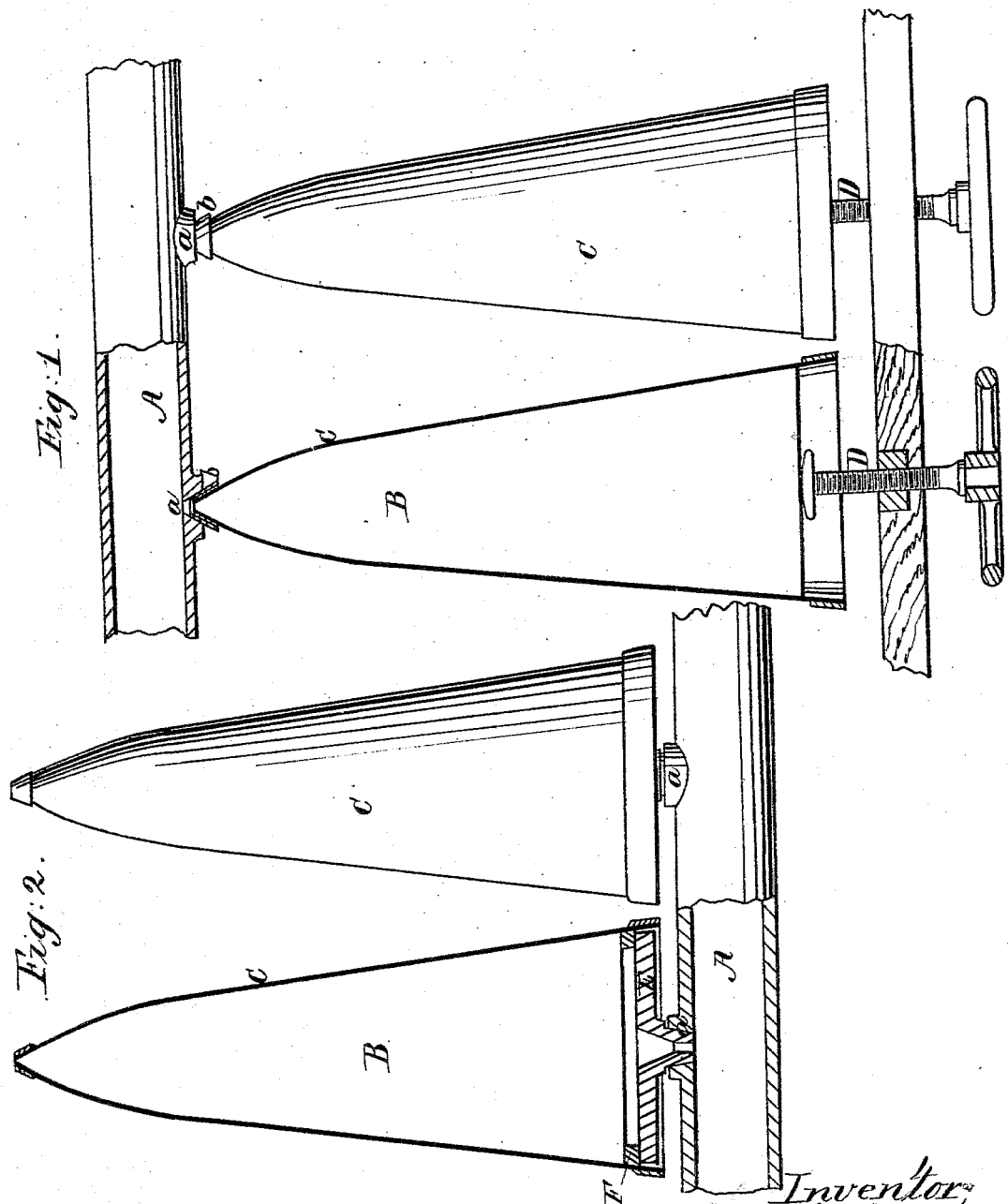

ALEXANDER HERBST, OF MOSCOW, RUSSIA.

Letters Patent No. 95,798, dated October 12, 1869.

---

IMPROVED APPARATUS FOR DRYING SUGAR.

---

The Schedule referred to in these Letters Patent and making part of the same.

---

*To all whom it may concern:*

Be it known that I, ALEXANDER HERBST, of Moscow, in the Empire of Russia, have invented a new and useful Improvement in Apparatus for Drying Sugar, of which the following is a full, clear, and exact description, reference being had to the accompanying drawing, forming part of this specification, and in which—

Figures 1 and 2 represent sectional elevations of two modifications in apparatus for drying sugar, according to my improvement.

My improvement relates to the drying of sugar in the loaf, and has for its object a much more rapid, but thorough drying, and clearer and more compact product than is attainable under the ordinary method.

In the present invention, the loaves or cones are dried within their moulds or formers, and the most perfect currents of heated and dried air made to permeate between the crystals from the apex of each cone to its base, while, by carrying on such operation in a suitably-heated room, the air thus passing, and formers containing the loaves, are prevented from being chilled or cooled.

The dry and heated air may either be forced or sucked through the loaves, to illustrate which is the object of the two modifications shown in the drawing.

Referring, in the first instance, to fig. 1 of the drawing—

A represents a hollow metal frame or tube, or it may be series of tubes, provided with suitable lower outlets, *a*.

This frame or tube is arranged within a drying-room, and has heated and dried air supplied to or forced into it by the action of a pump or otherwise.

The drying-room should be made capable of having its temperature raised or lowered, as required.

The sugar-loaves B, arranged within their formers or moulds C, are placed under the tube A, so that the open apex ends of the formers fit within the openings *a* in the tube, a flexible or soft inverted hopper-like cap or packing, *b*, being fitted over the apex end of each former, to secure a close joint of the former with the tube, as the loaf is forced upward, by a screw D, arranged below.

After a series of formers or moulds, containing sugar loaves, is thus made to establish connection with the outlets *a*, in the tube, air is forced, by a pump, through a suitable heating-apparatus, into the tube or hollow frame A, and from thence passes, by the outlets *a*, through the sugar-loaves B.

The temperature of such heated air may be varied, but a temperature of from 45° to 50° Reaumur, for the air as it enters the tube, will generally suffice, and to prevent such air from being cooled as it passes through the loaves, the air in the drying-room, in which the moulds and apparatus generally are located, should be kept at a like temperature.

In some cases it may be desirable to conduct the air, before it enters the heating-apparatus, above a layer of chloride of calcium, to dry it.

The heated, or heated and dried air thus made to enter the sugar-loaves at their apex ends, is, by the action of the pump, made to permeate the whole mass of sugar, being divided up into a series of currents as it passes between the crystals toward the interior of the formers and outward through the base of the loaves, absorbing the moisture from the sugar as it passes through it.

It may here be observed, that before the loaves are inserted in the moulds to be dried, the sirup should be dropped off or removed from them.

To properly prepare them for drying, the loaves, after being moulded, should be taken out of the formers and be placed on their bases, and their formers placed near them, with their pointed ends downward.

In a few hours the interior of the moulds will be dried, and the sirup in the points of the loaves dissolved, and the outer surface of the loaves be covered with a crust.

The loaves can only be taken out of the moulds when the sirup in their points is about one-fifth of the sirup in the whole mass; otherwise all surplus sirup must be removed.

This preparatory drying is necessary to prevent the sugar, in the further operation of drying herein previously described, sticking to the interior of the formers or moulds, which would render their removal, after such complete and subsequent drying, and which is the drying proper herein referred to, difficult.

By this, my improvement of drying the loaves in their formers, the drying may be effected in twenty-four hours, instead of from eight to twelve days, as under the old method.

In fig. 2 of the drawing, the loaves B are dried in their formers C, by suction of heated air from the drying-room made to enter at their points, by exhausting, through the action of a pump, from a tube, A, which communicates, by openings *a'*, through a base-plate, E, made to fit the interior of the formers at their base, and on which the loaves, through a suitable intervening rubber or other soft tightening-packing, F, are made to rest, said packing being of annular form, so as to leave an air-space between the plate E and base of the loaf. Thus employing suction instead of forcing heated air through the loaves while in their formers, involves some little more difficulty or trouble in placing or packing the loaves, and is, in some respects, inferior to working under the arrangement described for fig. 1, but like results, as regards rapidity of drying, clearness and compactness of the product, and the non-exposure of the loaves for a lengthened period to a high temperature, are secured.

What is here claimed, and desired to be secured by Letters Patent, is—

1. The process, substantially as herein described, of drying the loaves, by forcing or drawing currents of heated air through them, while in their moulds or formers, as herein set forth.

2. The apparatus, substantially as herein described, for holding and supporting the loaves while in their moulds or formers, and passing currents of heated air through the loaves, from their apex to their base, to effect the drying of the sugar within the formers, essentially as specified.

In witness whereof, I have hereunto set my hand, this 13th day of May, 1869.

ALEXANDER HERBST.

Witnesses:
 R. E. RABEAU,
 L. F. COHEN.